Patented Oct. 4, 1938

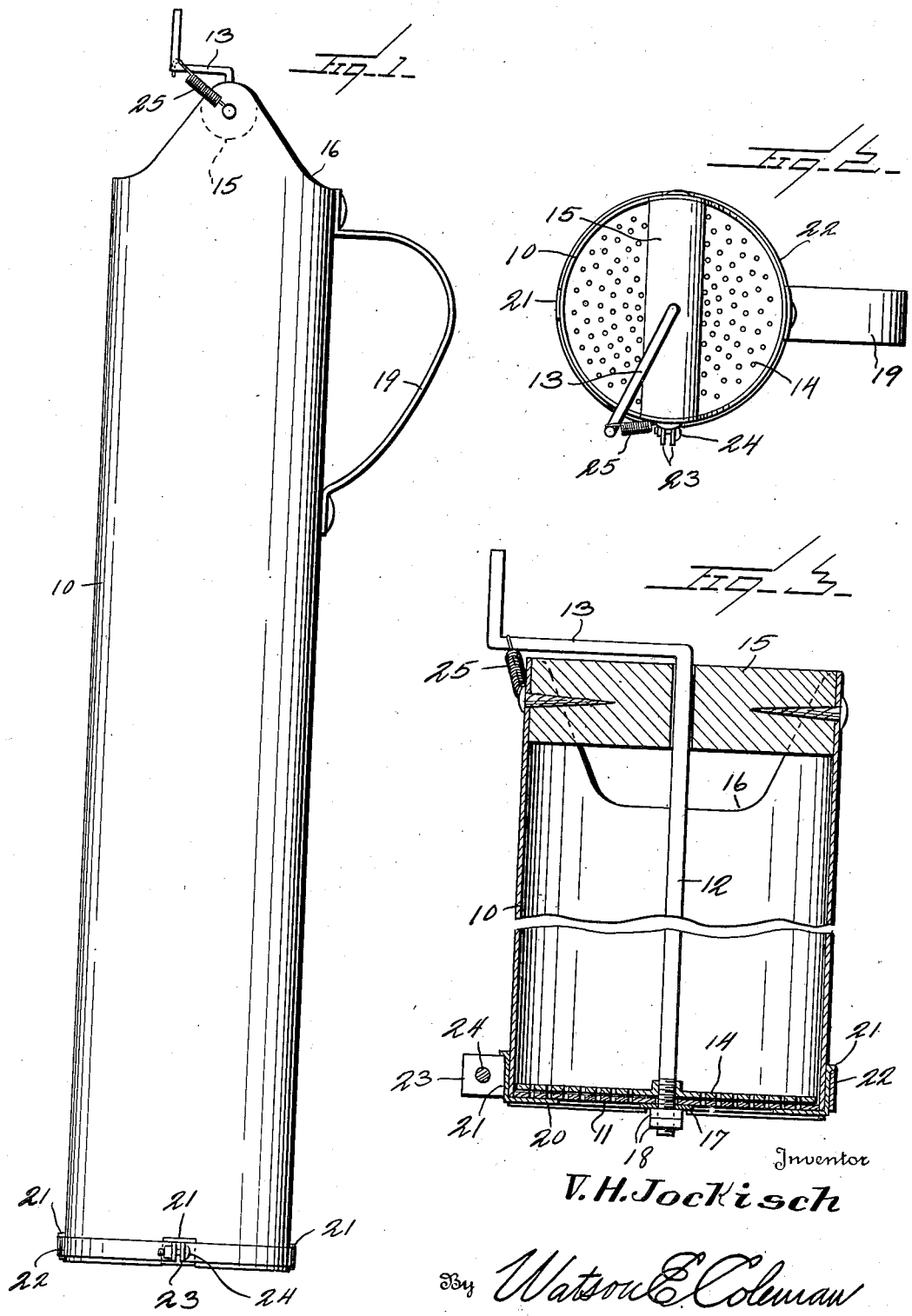

2,131,954

UNITED STATES PATENT OFFICE 2,131,954

PLANT DUSTER

Velmer Harrison Jockisch, Greensboro, Ala.

Application February 4, 1937, Serial No. 124,117

3 Claims. (Cl. 43—145)

This invention relates to devices for dusting plants with poisonous powder for the purpose of killing insects on the plants or preventing the infestation of the plants by insects.

The general object of the invention is to provide a duster of this character which is extremely simple, which has been found to be thoroughly effective in actual practice, and which is so constructed that it may be used either by shaking the container towards and from the plants and preventing the clogging of the perforations in the container by manipulating a perforated plate or be used by rotating or oscillating the perforated plate which is disposed in the bottom of the container, thereby causing the poisonous powder to sift in fine particles out through the plate.

Another object is to so construct the container and the means for discharging the powder that the powder will not clog in the container.

My invention is illustrated in the accompanying drawing wherein:

Figure 1 is an elevation of a plant duster constructed in accordance with my invention.

Figure 2 is a top plan view thereof.

Figure 3 is a vertical section enlarged, the middle portion of the container being cut away.

Referring to the drawing, 10 designates the container which is cylindrical in form and is of uniform diameter from end to end. The bottom 11 of the container is formed with a plurality of fine perforations. Extending through this bottom 11 is a shaft 12 having a crank handle 13 at its upper end. The lower end of the shaft 12 carries upon it the perforated plate 14 which has perforations adapted to register with the perforations of the plate or bottom 11 as the shaft 12 is turned by means of the crank handle. The upper end of the shaft 12 is supported in a bearing 15 which extends between diametrically opposite portions of the container, the upper end of the container being cut down on each side of the point of engagement between the member 15 and the wall of the container, as at 16. The lower end of the shaft carries a washer 17 and lock nuts 18. By this construction the shaft may be readily released from engagement with the container and withdrawn. A handle 19 is attached to one wall of the container adjacent its upper end.

In order to reduce the area of the perforated portion of the bottom 11 through which the powder may be discharged, I provide an annular shield 20 angular in cross-section so as to provide an upwardly extending portion or portions 21. This shield is held in place by means of a band 22 surrounding the lower end of the container, the band being split and having outwardly projecting lugs 23 through which a bolt 24 passes. By releasing this bolt, the band may be released and the shield may be removed, if desired. Obviously a number of shields having different widths may be provided so that the effective area of the perforated portion of the bottom may be regulated entirely in accordance with the plant being dusted and none of the poisonous dust being wasted.

Preferably, I attach to the wall of the container 10 at its upper end a contractile spring 25, one end of which is engaged with the crank handle 13.

This duster may be used in any one of three ways. It may be shaken up or down to discharge the powder through the perforations, assuming that the perforations in the plate or disk 14 register with the perforations in the bottom 11. If the perforations should become clogged, it is only necessary to give a slight rotation or oscillation to the shaft 12, which will eliminate any clogging.

Another way of using this device is to oscillate the shaft 12 by forcing the handle 13 in a direction to tension the spring 25, then releasing the handle, whereupon the spring 25 will draw the shaft back to its initial position. This oscillation of the handle may be readily accomplished by means of one hand while the other hand of the operator engages the handle 19.

A third way of using the device is to carry it by means of the handle 19 in one hand and then rotate the shaft 12 by means of the crank handle 13. This full rotation or partial rotation of the disk 14 loosens up the poison dust at the bottom of the can and permits it to be readily discharged.

In ordinary operations, especially for small plants, I have found it best to discharge the dust by an up and down shaking movement and if the poison dust seems to be slow in flowing, to give the crank 13 a turn by the hand.

Attention is particularly called to the fact that the container 10 has a uniform diameter from top to bottom. Any container which tapers toward the bottom acts to cause the dust to clog at the bottom and prevents the ready discharge of the dust.

It is also pointed out that as the crank 13 is turned or oscillated, the holes in the perforated disk 14 become filled with poison dust and this is released through the perforations in the plate 11, and thus the dust is applied directly to the plant without waste.

What is claimed is:—

1. A plant duster, including a cylindrical container having a uniform diameter throughout its length and having a perforated bottom, a shaft extending longitudinally through the container and through the bottom, a perforated disk carried by the lower end of the shaft and disposed adjacent the bottom, a bearing member extending across the upper end of the container and through which the shaft passes, the shaft having a handle whereby it may be rotated, a shield angular in cross-section and having a portion extending upward around the lower end of the container wall, an annular portion extending around the margin of the perforated bottom, a split band extending around the upwardly extending portion of said shield, and a bolt passing through the split portion of the band and adapted to hold it clamped upon the lower end of the container.

2. A plant duster, including a cylindrical container having a substantially uniform diameter throughout its length and having a rigid perforated bottom, a shaft extending longitudinally through the container and through the bottom, a perforated disk carried by the lower end of the shaft and disposed closely adjacent the bottom, means at the upper end of the container affording a bearing for said shaft and the shaft having a handle whereby it may be operated, a removable shield having an annular portion formed and constructed to extend beneath the outer margin of the perforated bottom over the marginal perforations thereof, and means for detachably holding the shield in place upon the container.

3. A plant duster, including a cylindrical container having a uniform diameter throughout its length and having a perforated bottom, a shaft extending longitudinally through the container and through the bottom, a perforated disk carried by the lower end of the shaft and disposed adjacent the inner face of the bottom, and having perforations registering with the perforations of the bottom, and a bearing member extending across the upper end of the container and through which the shaft passes, the shaft having a handle whereby it may be rotated.

VELMER HARRISON JOCKISCH.